United States Patent [19]

Dietz et al.

[11] Patent Number: 5,350,448
[45] Date of Patent: Sep. 27, 1994

[54] ELECTRICALLY CONDUCTIVE PIGMENTS

[75] Inventors: Johann Dietz, Dietzenbach; Klaus Franz, Kelkhiem; Gerhard Pfaff, Munster; Reiner Vogt, Wixhausen, all of Fed. Rep. of Germany; Katsuhisa Nitta, Fukushimi, Japan

[73] Assignee: Merck Patent Gesellschaft Mit Beschrankter Haftung, Darmstadt, Fed. Rep. of Germany

[21] Appl. No.: 50,797

[22] Filed: Apr. 22, 1993

[30] Foreign Application Priority Data

Apr. 25, 1992 [DE] Fed. Rep. of Germany ....... 4213747
Dec. 19, 1992 [DE] Fed. Rep. of Germany ....... 4243163

[51] Int. Cl.$^5$ ................................................ C09C 1/36
[52] U.S. Cl. .................................. 106/441; 252/518; 252/520; 106/415; 106/482
[58] Field of Search ............... 106/415, 436, 482, 441; 252/518, 520

[56] References Cited

U.S. PATENT DOCUMENTS

| | | | |
|---|---|---|---|
| 4,431,764 | 2/1984 | Yoshizumi | 524/409 |
| 4,442,593 | 11/1985 | Ostertag | 106/404 |
| 4,978,394 | 12/1990 | Ostertag et al. | 106/415 |
| 5,022,923 | 6/1991 | Rau et al. | 106/415 |
| 5,160,371 | 11/1992 | Ito | 106/415 |

FOREIGN PATENT DOCUMENTS 60-233167 5/1984 Japan.
60-223167 11/1985 Japan.
62-050344 8/1987 Japan.

OTHER PUBLICATIONS

Tadashi Endo et al., "The preparation and electrical properties of $TiO_{2-x}F_x$", J. Mater. Res. 3 (2)., Mar.-/Apr. 1988.

*Primary Examiner*—Karl Group
*Assistant Examiner*—Chris Gallo
*Attorney, Agent, or Firm*—Millen, White, Zelano, & Branigan

[57] ABSTRACT

A process for the preparation of light-colored, electrically conductive pigments based on substrates having an expansion of not more than 500 μm, which pigments consist of one or more metals, metal oxides or materials containing metal oxide, silicon oxide or silicate materials and contain, if desired above one or more other metal oxide and/or silicon oxide layers, an outer layer based on halogen-doped tin oxide and/or titanium oxide.

9 Claims, No Drawings

ELECTRICALLY CONDUCTIVE PIGMENTS

BACKGROUND OF THE INVENTION

The invention relates to light-colored, electrically conductive, platelet-like or non-platelet-like pigments, in which a suitably shaped substrate has been coated with an electrically conductive layer.

In many areas of industry, there is a need for conductive pigments which enable, for example, electrically conductive, antistatic or electromagnetically shielding plastics, lacquers, coatings, fibers, and the like to be produced. For this purpose, large amounts of conductive carbon black are used, which, however, cannot be used for transparent, light-colored or colored coatings owing to its high light absorption in the visible spectral region. A further problem is the strong absorption in carbon black in the IR region, which, for example upon exposure to sunlight, can lead to heating of the coated articles, which in many cases is undesirable.

EP 0,373,575 describes conductive platelet-like pigments in which a platelet-like substrate coated with one or more metal oxides is covered with a conductive film consisting of antimony-doped tin oxide, a thin $SiO_2$ film being provided between the conductive film and the metal oxide film. However, the reflection of IR radiation by these pigments does not fulfil all requirements. Moreover, while it is possible to obtain light-colored and colored pigments, due to the mass tone of the antimony-doped tin oxide layer, pigments which are largely transparent cannot be produced. The latter are, for example, of interest for the production of electrically conductive clearcoats.

U.S. Pat. No. 4,431,764 describes transparent, electrically conductive coatings comprising a film-forming binder and finely divided tin oxide doped with from 0.1 to 20% by weight of antimony in the form of $Sb_2O_3$ or $Sb_2O_5$.

However, electrically conductive tin oxides of this type have the disadvantage that they differ in the intensity of their blue color depending on the antimony content and the calcination temperature. In addition, antimony-containing tin oxides, as well as antimony oxide-containing substances in general, do not appear to be safe from a health and safety point of view. To obtain very light-colored products and to replace antimony as dopant there has recently been a switch to using halogen-doped tin oxides.

JP 62/050,344 describes mica and kaolinite platelets coated with indium/tin oxide (ITO), which are distinguished by relatively high transparency and relatively good electric conductivity. However, the process for producing these pigments described there, according to which coating takes place by heating an alcoholic suspension of the substrates to which $InCl_3$ and $SnCl_4$ has been added and evaporation of the alcohol, is very complicated and does not result in very uniform ITO films.

EP-A-0 448 946 discloses electrically conductive, halogen-doped tin(IV) oxides containing not more than 2% by weight of divalent tin and from 0.1 to 2.5% by weight of halides. They are used as fillers or pigments in plastics, lacquers, paints, paper, textiles and toners. The specific resistance of the tin(IV) oxides is less than 50 $\Omega \cdot m$. These materials contain no substrate.

However, the disadvantage is that depending on the method of preparation and the type and amount of the dopant the products obtained are grey to light-colored. Moreover, the approximately spherical tin oxide particles are difficult to incorporate into the contemplated application systems. Furthermore, it is known that a high electric conductivity can be conferred on an application system only if the amount of pigment added to it is so large that many mutually adjacent particles come into contact with one another. In the case of a spherical material this requires the use of particularly large amounts, which can have an adverse influence on the properties of the application system.

it is an object of the present invention to provide a conductive pigment which is light-colored and possesses a high reflectivity for IR radiation and whose hiding power can be optimised for the particular intended use.

This object is achieved according to the invention by a light-colored, electrically conductive pigment based on a substrate optionally coated with one or more metal oxide layers and containing halide-doped tin oxide and-/or titanium oxide as conductive layer.

The present invention also provides lacquers, printing inks, plastics or coatings which have been pigmented with the pigment of the invention.

The substrates can be platelet-like or else non-platelet-like. In the latter case, they are particles having an irregular or regular, for example more or less spherical, shape and an average diameter of less than 500 μm and in particular not more than 200 μm. Platelet-like substrates, which are preferred, have in the main dimension an extension of less than 500 and in particular less than 250 μm and a thickness of preferably less than 10, in particular not more than 5 and particularly preferably 0.1–3 μm. The ratio of the extension in the main dimension to the thickness (aspect ratio) of the platelet-like substrates is more than 3 and preferably more than 5.

The non-platelet-like substrates can be composed, for example, of $SiO_2$ or metal oxides, such as, for example, $Fe_2O_3$, $TiO_2$, $MTiO_3$ in which M is Mg, Ca, Ba, Sr, or $Al_2O_3$ and furthermore also of $BaSO_4$, $CaSO_4$ and $CaCO_3$. The platelet-like substrates are based on platelet-like and preferably transparent or semi-transparent substrates consisting of, for example, sheet silicates, such as mica, talc, kaolin, of glass or other silicate minerals. In addition, metal platelets, such as, for example, aluminium platelets or platelet-like metal oxides, such as, for example, platelet-like iron oxide or bismuth oxychloride are also suitable, this enumeration as well as that of materials for non-platelet-like substrates being merely understood as exemplary and not as limiting the invention.

The substrate can have been directly coated with the electrically conductive layer composed of halogen-doped tin oxide and/or titanium oxide, it being however preferred, in the case of non-silicate substrates, for a hydrated or unhydrated silicon dioxide layer or a layer comprising a different insoluble silicate to be present between the substrate surface and the electrically conductive layer. In platelet-like and non-platelet-like substrates, this insulating layer is preferably applied by the process given in EP 0,375,575. However, it is also possible to coat the substrate first with one or more layers consisting of, for example, chromium oxide, iron oxide, zirconium oxide, aluminiumoxide, tin oxide and/or further, colorless or colored metal oxides before applying the electrically conducting layer composed of halogen-doped tin oxide and/or titanium oxide as the outer layer. In this case, too, it is often preferred to provide an SiO$_2$ or silicate layer between the metal oxide film or the metal oxide films and the outer conductive layer.

The SiO$_2$ or silicate intermediate layer preferably amounts at least to about 5% by weight, calculated as SiO$_2$ and based on the weight of the substrate. In principle, there are no upper limits, but very thick intermediate layers often cause no more improvement in the pigment properties and, for example, in particular no more increase in the conductivity. Accordingly, SiO$_2$ or silicate intermediate layers having a weight proportion of between 5 and 30% by weight, relative to the weight of the substrate, are particularly preferred.

Preference is given to pigments according to the invention which, apart from the outer conductive layer and, if present, the SiO$_2$ or silicate intermediate layer, do not contain more than two additional metal oxide films.

The metal oxides used include not only colorless highly refractive metal oxides, such as, in particular, titanium dioxide and/or zirconium dioxide, but also colored metal oxides, such as, for example, chromium oxide, nickel oxide, copper oxide and in particular iron oxides, such as, for example, Fe$_2$O$_3$ or Fe$_3$O$_4$, or mixtures of such metal oxides. Such metal oxide/mica pigments are commercially available under the tradenames Afflair ® and Iriodin ® (manufacturer: E. MERCK, Darmstadt).

Particularly preferred substrate materials also include platelet-like pigments prepared as described in International Application PCT/EP 92/02 351.

They consist of a transparent, inorganic platelet-like matrix, preferably silicon dioxide, which can contain a non-soluble colorant. If, for example, a highly transparent conductive pigment is to be produced, a platelet-like substrate material may be used with a matrix consisting of silicon dioxide alone.

These conductive pigments are particularly suitable for producing electrically conductive clearcoats or transparent electrode layers.

However, if a light-colored, conductive pigment of high hiding power is desired, non-soluble colorants, for example titanium dioxide particles, may be incorporated into the transparent matrix. The advantage of this preferred substrate material for the preparation of the pigment of the invention is that it already has high hiding power.

The thickness of the individual metal oxide films is preferably not more than 500 run and in particular between 80 and 300 run. The weight proportion of the individual metal oxide films, relative to the weight of the substrate, is preferably between 20 and 200% by weight and in particular between 20 and 150% by weight.

Preference is given to electrically conductive pigments according to the invention based on platelet-like substrates. Owing to their platelet-like structure, these pigments arrange themselves in flat layers parallel to one another, and the light reflected from the interfaces of the various layers of these pigment particles interferes with the light reflected from the various pigment particles oriented in parallel to one another, resulting in the formation of interference colors which are dependent on the viewing angle, such as described, for example, in L. M. Greenstein, Optical behavior of nacreous and interference pigments, Pigment Handbook, New York 1973, p. 357 ff. Any absorption colors present, which may be due to a colored substrate and/or a colors metal oxide film, are superimposed by these interference colors, giving the pigment an aesthetically very attractive, perhaps differently colored, bright shimmer.

In terms of electric conductivity, the advantage of the pigments according to the invention is that, owing to their platelet-like shape, they can be readily incorporated in application systems, such as lacquers, plastics and the like. This results in the formation of contact areas between the pigment particle, which in turn leads to good conductivity in the application system.

The specific design of the pigments according to the invention depends on the particular profile required.

Pigments which are largely transparent in the visible spectral region are based, for example, in particular on silica substrates composed of, for example, glass, SiO$_2$, mica, kaolin, talc, and the like, which are directly coated with the electrically conductive layer consisting of halogen-doped tin oxide and/or titanium oxide; another possibility is that the substrate is first coated with a colorless metal oxide composed of, for example, tin oxide, zirconium oxide and/or alumina, on top of which, if desired, a thin intermediate layer consisting of SiO$_2$ or other insoluble silicates is present, followed by the outer conductive layer. These particularly preferred pigments are distinguished by a high transparency, high electric conductivity and high reflecting power for IR radiation and are particularly suitable for the production of electrically conductive clearcoats, transparent electrode layers and similar applications. In the case of platelet-like pigments which are transparent in the visible region, those pigments being preferred, these properties may be supplemented by that of interference color, which is essentially fixed by the thickness of the electrically conductive layer (see, for example, L. Armanini, Pigment and Resin Technology, October 1988, p. 4 ff.).

If, in contrast, an electrically conductive, colored pigment, possibly of higher hiding power, is desired, it is possible to use, for example, a substrate composed of colored metal oxides or a strongly reflecting metal substrate and/or to coat the substrate with one or more colored layers consisting of one or more metal oxides.

If transparent or semi-transparent substrates consisting of, for example, glass, SiO$_2$, mica, kaolin, talc or similar materials are first covered with one or more colored metal oxide films, the result is a colored pigment of high electric conductivity and high reflecting power for IR radiation which additionally may exhibit an interference color but which is often characterised by a relatively low hiding power. In contrast, the use of metallic substrates or metal oxide substrates results in many cases in very high hiding power.

Particular preference is given to platelet-like pigments based on metal platelets made of, for example, Al, Cr, Fe, steel or the like, which platelets are first covered with a thin layer consisting of SiO$_2$ or another silicate on top of which the outer conductive layer comprising halogen-doped tin oxide and/or titanium oxide is present.

Particular preference is furthermore given to platelet-like pigments based on transparent or semi-transparent substrates consisting of glass, SiO$_2$, mica, talc, kaolin or similar materials, the substrate being first covered with one or more colored metal oxide films above which the outer conductive layer, possibly separated by an intermediate layer consisting of SiO$_2$ or another insoluble silicate, is present. Pigments of this type are distinguished by an absorption color which is independent of the viewing angle, an interference color, if present, which is dependent on the viewing angle, a relatively low to moderate hiding power, high conductivity and high reflecting power for IR radiation.

The crucial difference between the pigments according to the invention and customary pigments resides in the outer electrically conductive layer which is formed by halogen-doped tin oxide and/or titanium oxide.

These surface coatings may be applied to the uncoated or precoated substrates, for example, in a fluidized-bed process, for example according to the following reaction equations:

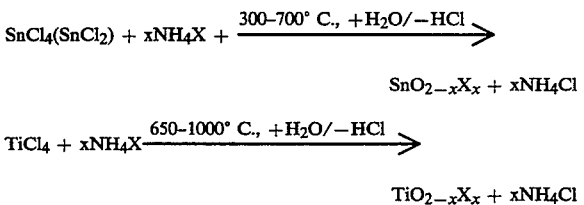

Application of the layers is preferably carried out within the temperature intervals given, deposition of mixed layers also being possible within the overlapping temperature range. Deposition of SnO$_{2-x}$X$_x$ takes place in particular at 300°–600° C. and that of TiO$_{2-x}$X$_x$ preferably at 800°–1000° C.

Fluidized-bed coating processes are known per se; thus, for example, EP 0,106,235 describes a process for coating platelet-like substrates with metal oxides and DE 2,454,138 describes a process for coating isometric particles. The process according to the invention uses the process variants described there as orientation, fairly large deviations being however also possible.

The reaction equations given are to be understood as exemplary; other hydrolysable tin compounds and/or titanium compounds and halides can also be used.

The outer conductive SnO$_{2-x}$X$_x$ and/or TiO$_{2-x}$X$_x$ layers can also be applied by wet-chemical methods, the reaction proceeding, for example, according to the following reaction equation to be understood as exemplary:

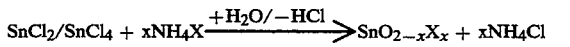

In the above reaction equations, X is halide, in particular I−, Br− or Cl− and very particularly preferably F−. In the case of wet-chemical coating, the use of mixtures (or the successive addition) of 2- and 4-valent tin compounds or 3- and 4-valent titanium compounds is in many cases preferred; in wet-chemical coating, the use of SnCl$_2$ and SnCil$_3$ and/or TiCl$_3$ and TiCil$_4$ is particularly preferred. However, not only in wet-chemical coating but also in particular in fluidized-bed coating, it is possible to use tin compounds and titanium compounds of only one oxidation state. Wet-chemical deposition preferably takes place in the acidic pH range and in particular in a pH range between 1.2 and 4.

If alcohol is used as solvent, it is possible to use only tetravalent tin compounds in the wet-chemical coating. In this case the alcoholic solution of a tin salt, for example tin tetrachloride, and the particular ammonium halides are metered into the aqueous suspension of the substrate at a pH of from 1.0 to 7.0, preferably from 1.8 to 3.5, and at a temperature within the range from 40° to 90° C., preferably from 60° C. to 90° C., in such a way that in each case hydrolysis and precipitation onto the platelet-like substrate takes place immediately.

The degree of doping given by the weight ratio of NH$_4$X and SnCl$_2$/SnCl$_4$ and/or TiCl$_4$ is preferably less than 10% and in particular not more than 5% in both processes; very particular preference is given to doped layers having a degree of doping of between 1 and 5%; the same preferred ranges also apply when other tin compounds and/or titanium compounds are used. Apart from the tin compounds or titanium compounds explicitly mentioned, other hydrolyzable tin compounds or titanium compounds can also be used. Instead of NH$_4$X, other water-soluble halides or halides which are volatile under the fluidised bed reactor conditions can also be used.

The doped tin-oxide and/or titanium oxide layers are written in the above reaction equations as SnO$_{2-x}$X$_x$ and TiO$_{2-x}$X$_x$, these formulae also comprising, if desired, hydrated tin oxide and/or titanium oxide layers. Doping of SnO$_2$ and/or TiO$_2$ with halogen for achieving electrical conductivity is known per se and described, for example, in T. Endo, N. Moriata, T. Sato, M. Shimada, J. Mater, Res. 3 (1988) 392–397. However, halogen-doped tin oxide and titanium oxide have previously only been used for coating large-area substrates, such as, for example, glass surfaces, and thus it was surprising that the coating of small particles whose dimensions are in the micrometer or sub-micrometer range produces firmly adhering surface coatings. It was particularly surprising that coating of platelet-like substrates results in smooth, firmly adhering layers of uniform thickness, which is an essential requirement for the specific optical properties of these systems, i.e. luster and interference colors.

The outer layer can either consist of halogen-doped tin oxide or titanium oxide or else be a mixture of these two doped metal oxides; the mixing ratio of these oxides is not critical, it being possible to use SnO$_{2-x}$X$_x$ and TiO$_{2-x}$X$_x$ mixed oxides of any desired composition.

Furthermore, in addition to SnO$_{2-x}$X$_x$ and/or TiO$_{2-x}$X$_x$, the outer layer can also contain other metal oxides. Thus, for example, it may be advantageous to add other metal oxides to the outer layer, such as, for example, alumina, iron oxide, zirconium oxide, chromium oxide or further oxides, in order to increase the heat or mechanical stability, in order to produce special color effects or for other reasons. Since these additives in general increase the resistivity of the pigments and, in many cases, reduce the reflecting power for IR radiation and the transparency of the outer layer to visible light the weight proportion of the outer layer is selected such that it is preferably not excessively high and in particular less than 25% by weight. Particular preference is given to pigments in which such additives amount to less than 10% by weight and in particular less than 5% by weight and very particular preference is given to pigments whose outer layer exclusively consists of halogen-doped tin oxide and/or titanium oxide.

The thickness of the outer layer is preferably not too great and in particular less than 300 nm. The weight proportion of the outer layer, relative to the weight of the substrate, is preferably between 20 and 200 and in particular between 60 and 150% by weight.

The content of halides, individually or mixed, in the conductive layer is from 0.1 to 2.5% by weight, preferably from 0.5 to 1% by weight. The dopants are preferably used in the forth of tin(IV) or ammonium halides. The desired homogeneous distribution of tin and halides in the conductive layer is easy to achieve by metering the alcoholic solution of a tin salt, for example tin tetrachloride, and the respective ammonium halides into the aqueous suspension of the substrate material at a pH of from 1.0 to 7.0, preferably from 1.8 to 3.5, and at a temperature within the range from 40 to 90° C., preferably from 60° C. to 90° C., in such a way that in each case a hydrolysis and precipitation on the platelet-like substrate material takes place immediately. The coated substrate material is separated off and calcined at 300° C. to 900° C. for 5 min to 120 min. Depending on the substrate material an additional prior coating of the substrate material with tin dioxide in a conventional manner may be advantageous.

The outer layer gives the pigments according to the invention great electrical conductivity, and the resistivity is in general between 5 and $2 \times 10^5$ Ω cm, depending on the composition of the outer layer.

To measure the resistivity of the pigments, a small amount of about 0.5 g of pigment is compressed in an acrylic glass tube 2 cm in diameter by means of a weight of 10 kg between two metal pistons. The electrical resistance R of the pigments thus compressed is measured. The layer thickness L of the compressed pigment gives the resistivity ρ according to the relationship $$\rho = R \cdot \frac{\pi \cdot (d/2)^2}{L} \text{ [ohm} \cdot \text{cm]}$$

Particular preference is given to pigments according to the invention having a resistivity of not more than 50 kΩcm and in particular having a resistivity of not more than 25 kΩcm.

Furthermore, the outer layer gives the pigments according to the invention high reflecting power in the IR range, which, depending on the composition of the outer layer, is on average greater than 75% in the wavelength range between 4,000 and 20,000 nm and in many cases even greater than 85%. Very particular preference is given to pigments according to the invention having on average a reflecting power of more than 90% in the wavelength region mentioned.

The optical properties of the pigments according to the invention in the visible spectral region can be varied over a wide range and tailored in view of the particular application.

Thus, for example, pigments which are highly transparent in the visible region can be obtained by using transparent substrates made of, for example, glass or other silicate materials which are directly coated with the outer layer. Specifically platelet-like pigments exhibiting such properties are highly suitable for producing electrically conductive, transparent coatings. In the case of clearcoating formulations containing such pigments, they are simply sprayed onto the particular substrate, for example a glass sheet, a metallic workpiece or the like, in a thin film, while customary coatings consisting of halogen-doped tin oxide and/or titanium oxide are produced by vapor deposition and then coated with a thin plastic film for mechanical protection, which is much more complicated. By coating, for example, aluninium substrates with an outer layer containing halogen-doped tin oxide or titanium oxide, the sensitivity of the alluminium substrates to hydrolysis is drastically reduced, as a result of which pigments of this type can be used, for example, in water-borne formulations. As already mentioned, in the case of non-silicate substrates, it is often advantageous to provide an SiO₂ layer or a layer comprising an insoluble silicate between the substrate and the outer layer. Apart from aluminium substrates, other metallic substrates made of, for example, chromium, iron or steel can also be used, platelet-like metallic substrates being preferred.

For electrostatic coatings, for example of instrument casings, or for the pigmenting of antistatic floor coverings and also for further applications, colored, electrically conductive pigments having high reflecting power in the IR are often required, which, as already mentioned, can be achieved by using colored substrates and/or colored metal oxide films, which are applied between the substrate surface and the outer layer, and/or by admixing to the outer layer colored metal oxides, it being possible for the hiding power to be varied within wide limits. Here too it is often advantageous to apply an intermediate layer made of SiO₂ or another insoluble silicate material between the metal oxide films and the other, electrically conductive layer.

The listed possible applications of the pigments according to the invention are merely to be understood as exemplary and are merely intended for illustrating the invention without limiting it. However, whatever the specific profile required for a certain application may look like, one skilled in the art can vary the properties of the pigments over a wide range and optimize them in view of the particular application.

The pigments according to the invention are prepared by coating the substrate selected in each case first, if desired, with one or more other metal oxide films consisting of, for example, chromium oxide, iron oxide, zirconium oxide, alumina and/or further metal oxides. Processes for the deposition of other metal oxides on platelet-like substrates are described, for example, in DE 1,959,998, DE 2,215,191, DE 2,244,298, DE 2,313,331, DE 2,522,572, DE 3,137,808, DE 3,151,343, DE 3,151,355, DE 3,211,602 or DE 3,235,017. It has been found that the processes presented there can also be used for coating non-platelet-like substrates.

The application of thin intermediate layers consisting of SiO₂ or other insoluble silicate materials to platelet-like substrates is described in EP 0,373,575. It has been shown that this process can also be applied to non-platelet-like substrates. Such intermediate layers are, if required, arranged in particular directly before the outer, electrically conductive layer, although it is also possible that the silicate intermediate layer or intermediate layers are present between the metal oxide films.

The coated or uncoated substrates thus prepared are then provided with the outer electrically conductive surface coating using the process described above. Outer layers containing, in addition to halogen-doped tin oxide and/or titanium oxide, one or more further metal oxides are produced by the fluidized-bed process by reacting further metal chlorides and/or metal carbonyls in the above gas-phase reaction; in contrast, in the wet-chemical reaction, solutions containing tin chloride and titanium chloride and, if desired, further metal chlorides are reacted in a suitable manner with soluble fluorides.

The pigments according to the invention are distinguished by high electrical conductivity, high reflecting power for IR radiation and a hiding power which can be optimized in view of the particular application and an optimizable color. Depending on their specific design, the pigments according to the invention can be used for a wide range of applications, such as, for example, for transparent electrodes for controlling, for example, liquid-crystal displays, for antistatic coatings or for antistatic plastics, floor coverings and the like. The pigments according to the invention often fulfil the requirements resulting from the particular applications better than customary pigments and constitute in any case a substantial widening of the pool of such compounds available to one skilled in the art. Thus, the compounds according to the invention are of considerable economic importance.

The examples which follow are intended to illustrate the invention without limiting it.

In the foregoing and in the following examples, all temperatures are set forth uncorrected in degrees Celsius; and, unless otherwise indicated, all parts and percentages are be weight.

The entire disclosure of all applications, patents and publications, cited above and below, and of corresponding German application Nos. P 42 13 747.0, filed April 25, 1992 and P 42 43 163.8, filed December 19, 1992, are hereby incorporated by reference. de

EXAMPLES

Example 1

100 g of mica having a particle size of 10–60 μm are suspended in 2000 ml of fully deionized water, the suspension is heated to 75° C., and 400 ml of a hydrochloric acid solution containing 84.6 g of $SnCl_4*5H_2O$, 6.0 g of $SnCl_2*2H_2O$ and 100 ml of conc. HCl are continuously added over a period of 4 hours with stirring. An $NH_4F$ solution (4.0 g of $NH_4F$ in 300 ml of $H_2O$) is simultaneously metered into the mica suspension from a different vessel over a period of 4 hours. During the entire reaction time, the pH is kept constant at 1.8 by means of 15% sodium hydroxide solution. During the reaction, nitrogen is passed over the reaction suspension. Stirring at 75° C. is continued for 30 minutes, and the mixture is then allowed to settle for 10 hours. The solid is then filtered off, washed with about 20 l of water until free of chloride and dried at 110° C. The product thus obtained is calcined in air or under a nitrogen atmosphere in a temperature range from 300°–700° C. This gives light-colored pigments containing, in the conducting layer on the mica surface, the amount of fluoride sufficient for specific conductance.

In the table below, the resistivities measured at different calcining temperatures are listed:

| Calcining temperature/°C. | Resistivity/kiloohm · cm |
| --- | --- |
| 300 | 2,000 |
| 500 | 9 |
| 600 | 25 |
| 700 | 150 |

The resistance of the pigments is measured using the abovementioned arrangement. The inner diameter of the plexiglass tube d is 1 cm, and about 0.5 g of the pigment prepared is compressed under a load of 10 kg between the two metal pistons.

EXAMPLE 2

Analogously to Example 1, 100 g of mica having a particle size of 10–60 μm are suspended in 2000 ml of fully deionized water, the suspension is heated to 75° C., and 400 ml of a hydrochloric acid solution containing 37.2 g of $SnCl_4*5H_2O$, 6.7 g of $SnCl_2*2H_2O$ and 100 ml of conc. HCl are continuously added over a period of 4 hours with stirring. An $NH_4F$ solution (2.0 g of $NH_4F$ in 300 ml of $H_2O$) is simultaneously metered into the mica suspension from a different vessel over a period of 4 hours. During the entire reaction time, the pit is kept cons-ant at 1.8 by means of 15% sodium hydroxide solution. During the reaction, nitrogen is passed over the reaction suspension. Stirring at 75° C. is continued for 30 minutes, and the mixture is then allowed to settle for 10 hours. The solid is then filtered off, washed with at&Put 20 l of water until free of chloride and dried at 110° C. The product thus obtained is calcined in air or under a nitrogen atmosphere in a temperature range from 300°–700° C. This gives light-colored pigments containing, in the conducting layer on the mica surface, the amount of fluoride sufficient for specific conductance.

In the table below, the resistivities measured at different calcining temperatures are listed:

| Calcining temperature/°C. | Resistivity/kiloohm · cm |
| --- | --- |
| 300 | 140 |
| 400 | 4 |
| 500 | 1 |
| 600 | 45 |

The resistance of the pigments is measured using the arrangement mentioned in Example 1.

EXAMPLE 3

Analogously to Example 1; 100 g of mica having a particle size of 10–60 μm are suspended in 2000 ml of fully deionized water, the suspension is heated to 75° C., and 400 ml of a hydrochloric acid solution containing 37.2 g of $SnCil_4*5H_2O$, 6.7 g of $SnCl_2*2H_2O$ and 100 ml of conc. HCl are continuously added over a period of 4 hours with stirring. A hydrofluoric acid solution (2.63 g of hydrofluoric acid, 38–40%, high-purity grade in 300 ml of $H_2O$) is simultaneously metered into the mica suspension from a different vessel over a period of 4 hours. During the entire reaction time, the pH is kept constant at 1.8 by means of 15% sodium hydroxide solution. During the reaction, nitrogen is passed over the reaction suspension. Stirring at 75° C. is continued for 30 minutes, and the mixture is then allowed to settle for 10 hours- The solid is then filtered off, washed with about 20 l of water until free of chloride and dried at 110° C. . The product thus obtained is calcined in air or under a nitrogen atmosphere in a temperature range from 300°–700° C. This gives light-colored pigments containing, in the conducting layer on the mica surface, the amount of fluoride sufficient for specific conductance.

In the table below, the resistivities measured at different calcining temperatures are listed:

| Calcining temperature/°C. | Resistivity/kiloohm · cm |
| --- | --- |
| 300 | 500 |
| 400 | 190 |
| 500 | 22 |
| 600 | 11 |
| 700 | 50 |

The resistance of the pigments is measured using the arrangement mentioned in Example 1.

EXAMPLE 4

Analogously to Example 1, 100 g of mica having a particle size of !0–60 μm are suspended in 2000 ml of fully deionized water, the suspension is heated to 75° C., and 400 ml of a .hydrochloric acid solution containing 76.0 g of TiCil₄, 13.4 g of SnCl₂*2H₂O and 100 ml of conc. HCl are continuously added over a period of 4 hours with stirring. An NH₄F solution (4.0 g of NH₄F in 300 ml of H₂O) is simultaneously metered into the mica suspension from a different vessel over a period of 4 hours. During the entire reaction time, the pH is kept constant at 1.8 by means of 15% sodium hydroxide solution. During the reaction, nitrogen is passed over the reaction suspension. Stirring at 75° C. is continued for 30 minutes, and the mixture is then allowed to settle for 10 hours. The solid is then filtered off, washed with about 20 l of water until free of chloride and dried at 110° C. The product thus obtained is calcined in air or under a nitrogen atmosphere in a temperature range from 300°–700° C. This gives light-colored pigments containing, in the conducting layer on the mica surface, the amount of fluoride sufficient for specific conductance.

In the table below, the resistivities measured at different calcining temperatures are listed:

| Calcining temperature/°C. | Resistivity/kiloohm · cm |
| --- | --- |
| 500 | 20,000 |
| 600 | 70,000 |

The resistance of the pigments is measured using the arrangement mentioned in Example 1.

EXAMPLE 5

Analogously to Example 1, 100 g of mica having a particle size of 10–60 μm are suspended in 2000 ml of fully deionized water, the suspension is heated to 75° C., and 400 ml of a hydrochloric acid solution containing 76.0 g of TiCl₄, 105 g of a 15% TiCl₃ solution and 100 ml of conc. HCl are continuously added over a period of 4 hours with stirring. An NH₄F solution (4.0 g of NH₄F in 300 ml of H₂O) is simultaneously metered into the mica suspension from a different vessel over a period of 4 hours. During the entire reaction time, the pH is kept constant at 1.8 by means of 15% sodium hydroxide solution. During the reaction, nitrogen is passed over the reaction suspension. Stirring at 75° C. is continued for minutes, and the mixture is then allowed to settle for hours. The solid is then filtered off, washed with about 20 l of water until free of chloride and dried at 110° C. The product thus obtained is calcined in air or under a nitrogen atmosphere in a temperature range from 300°–700° C. This gives light-colored pigments containing, in the conducting layer on the mica surface, the amount of fluoride sufficient for specific conductance.

In the table below, the resistivities measured at different calcining temperatures are listed:

| Calcining temperature/°C. | Resistivity/kiloohm · cm |
| --- | --- |
| 500 | 80,000 |
| 600 | 130,000 |

The resistance of the pigments is measured using the arrangement mentioned in Example 1.

EXAMPLE 6

100 g of mica having a particle size of 10–60 μm are suspended in 2000 ml of an aqueous solution containing 25.0 g of NH₄F. The suspension is heated to 85° C. A solution prepared from 40.8 g of TiCl₄, 600 ml of ethanol, 100 ml of concentrated hydrochloric acid and 300 ml of water is then swiftly added dropwise to the initially introduced suspension with vigorous stirring. During addition of this solution, the pH of the reaction medium is kept constant at 3.5 using 15% ammonia solution. After addition of the titanium-containing solution is complete, the pH is brought to 7.0 with ammonia solution and maintained at this value during the additional stirring period of 3 hours at 85° C. During this period, the reaction vessel is open, so that a substantial amount of ethanol and water evaporates. The mixture is now allowed to settle for 10 hours, and the product is worked up as described in Example 1.

In the table below, the resistivities measured at different calcining temperatures are listed:

| Calcining temperature/°C. | Resistivity/kiloohm · cm |
| --- | --- |
| 500 | 130,000 |
| 600 | 200,000 |

The resistance of the pigment is measured using the arrangement mentioned in Example 1.

EXAMPLE 7

50 g of TiO₂-pigmented SiO₂ platelets prepared as described in International Application PCT/EP 92/02 351 are suspended in 1 l of water by stirring at 600 rpm, heated to 75° C., adjusted to pH 1.8 with dilute hydrochloric acid and admixed at a rate of 2 ml/min with an aqueous tin tetrachloride solution consisting of 2.95 g of SnCil₄×5 H₂O and 5 ml of concentrated hydrochloric acid in 50 ml of water. The pH is kept constant with NH₃ solution. Then an ammonium fluoride solution consisting of 30 g of NH₄F in 150 ml of water is added, the suspension is heated to 85° C. and the pH is adjusted to 3.5 with dilute hydrochloric acid. Thereafter a solution of 25 g of anhydrous tin tetrachloride in 500 ml of ethanol is added at a rate of 2 ml/min. The pH is kept constant with NH₃ solution. The suspension is then filtered with suction and the filter residue is washed salt-free, dried in a drying cabinet and calcined at 500° C. in air for 15 min.

The product obtained is a yellowish white pigment having a powder resistance of 420 kiloohm·cm.

EXAMPLE 8

50 g of TiO₂-pigmented SiO₂ platelets are suspended in 500 ml of water. Then a solution of 2.9 g of SnCil₄×5 H₂O and 5 ml of concentrated HCl in 40 ml of water is added at a rate of 0.8 ml/min at 75° C. and pH 1.8 with a stirrer speed of 500 rpm in order to coat the surface with SnO₂. The pH is kept constant with 25% strength NH₃ solution. After the first coating has ended, 25 g of NH₄F are added and a pH of 3.5 is set with HCl. Then a solution of 55 g of SnCl₄ in 400 ml of ethanol is added at a rate of 2 ml/min to the suspension, now heated to 85° C., while the pH is again kept constant with 25% strength NH₃ solution. After the addition has ended, the suspension is cooled down somewhat and then filtered with suction. The sample is dried in a drying cabinet and calcined at 500° C. for 30 min; one sample under nitrogen, one sample in the air. Three weeks after being prepared the two samples have a powder resistance of about 20 kiloohm·cm.

The preceding examples can be repeated with similar success by substituting the generically or specifically described reactants and/or operating conditions of this invention for those used in the preceding examples.

From the foregoing description, one skilled in the art can easily ascertain the essential characteristics of this invention and, without departing from the spirit and scope thereof, can make various changes and modifications of the invention to adapt it to various usages and conditions.

We claim:

1. An light-colored, electrically conductive pigment comprising a substrate optionally coated with at least one metal oxide layer and thereon a conductive layer comprising halogen-doped tin oxide and/or halogen doped titanium oxide.

2. A pigment according to claim 1, wherein an hydrated silicon dioxide layer or a layer of an insoluble silicate is located between the substrate surface and the outer conductive layer.

3. A pigment according to claim 1, wherein the substrate is platelet-shaped.

4. A pigment according to claim 3, wherein the platelet-shaped substrate comprises a sheet silicate or glass platelets.

5. A pigment according to claim 3, wherein the platelet-shaped substrate comprises a transparent, inorganic matrix comprising an inorganic pigment.

6. A pigment according to claim 5, wherein the matrix is silicon dioxide.

7. A pigment according to claim 5, wherein the inorganic pigment is titanium dioxide.

8. A pigment according to claim 3, wherein the platelet-shaped substrate comprises silicon dioxide platelets.

9. In a pigmenting lacquer, printing ink, or plastic system comprising a pigment, the improvement wherein the pigment is one of claim 1.

* * * * *